United States Patent
Clinton et al.

(10) Patent No.: US 12,267,409 B2
(45) Date of Patent: Apr. 1, 2025

(54) INCREASED DATA INTEGRITY FOR AUTHENTICATED ENCRYPTION ALGORITHMS

(71) Applicant: Microchip Technology Incorporated, Chandler, AZ (US)

(72) Inventors: David Joseph Clinton, Coopersburg, PA (US); Patrick Bailey, Port Coquitlam (CA)

(73) Assignee: Microchip Technology Incorporated, Chandler, AZ (US)

( * ) Notice: Subject to any disclaimer, the term of this patent is extended or adjusted under 35 U.S.C. 154(b) by 601 days.

(21) Appl. No.: 17/304,011

(22) Filed: Jun. 11, 2021

(65) Prior Publication Data
US 2021/0391978 A1    Dec. 16, 2021

Related U.S. Application Data

(60) Provisional application No. 62/705,194, filed on Jun. 15, 2020.

(51) Int. Cl.
| | |
|---|---|
| H04L 9/06 | (2006.01) |
| G06F 11/10 | (2006.01) |
| G06F 13/40 | (2006.01) |
| G06F 13/42 | (2006.01) |

(52) U.S. Cl.
CPC ........ *H04L 9/0637* (2013.01); *G06F 11/1004* (2013.01); *G06F 13/4027* (2013.01); *G06F 13/4282* (2013.01); *H04L 9/0631* (2013.01); *G06F 2213/0026* (2013.01)

(58) Field of Classification Search
CPC ............................ H04L 9/0637; G06F 11/1004
USPC ........................................................ 380/28
See application file for complete search history.

(56) References Cited

U.S. PATENT DOCUMENTS

| | | | | |
|---|---|---|---|---|
| 5,935,268 | A | * | 8/1999 | Weaver ................. H03M 13/35 |
| | | | | 714/758 |
| 2006/0285684 | A1 | | 12/2006 | Rogaway |
| 2020/0151362 | A1 | | 5/2020 | Harriman et al. |
| 2021/0211467 | A1 | * | 7/2021 | Naeimi ............... H04L 63/0245 |

OTHER PUBLICATIONS

Chen, "Authenticated Encryption Modes of Block Ciphers, Their Security and Implementation Properties", Seminararbeit, Ruhr-Universität-Bochum, (2009) 20 pages.
Dworkin, "Recommendation for Block Cipher Modes of Operation: Galois/Counter Mode (GCM) and GMAC", National Institute of Standards and Technology, U.S. Department of Commerce, NIST Special Publication 800-38D, (Nov. 2007) 39 pages.
Keller, et al., "The Galois/Counter Mode (GCM) and GMAC Validation System (GCMVS) with the Addition of XPN Validation Testing", National Institute of Standards and Technology, Information Technology Laboratory, Compurter Security Division, (Original: Feb. 11, 2009, Updated: Jun. 15, 2016) 11 pages.

(Continued)

*Primary Examiner* — Anthony D Brown
(74) *Attorney, Agent, or Firm* — TraskBritt

(57) ABSTRACT

One or more examples relate, generally, to systems, methods and devices for performing authenticated encryption that provides assurance of the authenticity of data through the encryption and decryption processes.

16 Claims, 8 Drawing Sheets

(56) References Cited

OTHER PUBLICATIONS

Gilgor et al., "Fast Encryption and Authentication: XCBC Encryption an dXECB Authentication Modes", XP002178464, (Oct. 27, 2000), Internet Citation, retrieved from URL: http//citeseer.nj.nec.com/cs, retrieved Sep. 25, 2021, 12 pages.
International Search Report from International Application No. PCT/US2021/070698, mailed Sep. 17, 2021, 5 pages.
International Written Opinion from International Application No. PCT/US2021/070698, mailed Sep. 17, 2021, 9 pages.

* cited by examiner

INCREASED DATA INTEGRITY FOR AUTHENTICATED ENCRYPTION ALGORITHMS

CROSS-REFERENCE TO RELATED APPLICATIONS

This application claims the benefit under 35 U.S.C. § 119(e) of U.S. Provisional Patent Application Ser. No. 62/705,194 filed Jun. 15, 2020, the contents and disclosure of which is hereby incorporated herein in its entirety by this reference.

FIELD

One or more examples relate, generally, to electronic communication and communication systems. One or more examples relate, generally, to data integrity and to end-to-end data integrity that may be suitable for high reliability applications. One or more examples relate, generally, to encryption and forms of encryption that simultaneously assure confidentiality and authenticity of data, and more specifically, to authenticated encryption.

BACKGROUND

Security and authenticity of data are important considerations in a variety of contexts, including without limitation data communication utilizing electronic communication systems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
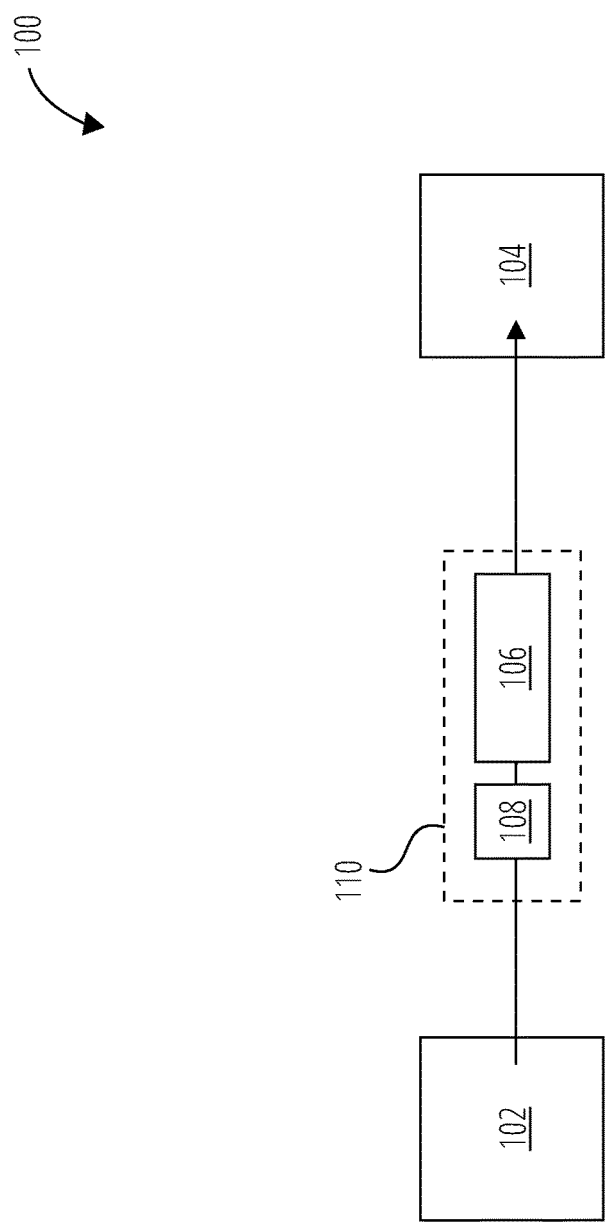
FIG. 1 is a block diagram depicting an electronic communication system, in accordance with one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of a disclosed example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, algorithms, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein—all of which are encompassed by use of the term "processor." A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," etc., is used for clarity and convenience in understanding the disclosure and accompanying drawings and does not connote or depend on any specific preference, orientation, or order, except where the context clearly indicates otherwise.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

As used herein, "string" means a sequence of symbols. As used herein, "code" means a string generated by performing specific operations, where the specific operations impart a specific utility to the generated string.

Authenticated encryption algorithms are algorithms that, in theory, simultaneously assure the confidentiality and authenticity of data.

As a non-limiting example, GCM is a mode of operation for symmetric key cryptographic block ciphers, and which is often paired with the Advanced Encryption Standard (AES) symmetric key cryptographic block cipher (algorithms that utilize the GCM mode for AES are referred to as "AES-GCM algorithms"). AES-GCM algorithms are used for encryption schemes for network communication.

Authenticated encryption with associated data is a variation of authenticated encryption that authenticates encrypted data and so called "associated data" that is not encrypted, in a message. Non-limiting examples of approaches to authenticated encryption algorithms include encrypt then authenticate, encrypt and authenticate, and authenticate then encrypt. Non-limiting examples of authenticated encryption algorithms utilized with block ciphers includes Galois Counter Mode (GCM), Carter-Wegman with counter mode (CWC mode), counter with cipher block chaining message authentication code (CCM mode), or offset codebook mode (OCB mode), without limitation.

As a non-limiting example, the authentication mode of AES-GCM involves generation of a message authentication code, referred to as the GCM Message Authentication Code (GMAC) or "GMAC tag," which is designed to reveal both accidental errors and intentional modifications of data during transmission. AES-GMAC is a specialization of the AES-GCM algorithm sometimes used to provide authentication assurance in instances where the input data is not encrypted.

Authenticated encryption algorithms known to the inventors of this disclosure, such as AES-GCM, do not include (e.g., natively, without limitation) a mechanism to detect hard or soft errors that occur during the encryption or decryption phases of the algorithm. In communication systems for high reliability products, end-to-end data integrity is typically a requirement, and undetectable errors are unacceptable. Techniques for preserving end-to-end data integrity in communications secured utilizing an AES-GCM algorithm known to the inventors of this disclosure typically involve changing a message structure by enhancing the message structure so that the enhanced message carries the original message and an error detecting code, encrypting the enhanced message, and generating an authentication code utilizing the encrypted enhanced message. Changes to a message structure are not permitted by some communication protocols or may be otherwise undesirable.

The inventors of this disclosure appreciate that it would be desirable to have a mechanism to provide end-to-end data integrity that includes the encryption and decryption processes utilized in authenticated encryption algorithms without changing the message structure transmitted to communicate the message according to a specific communication protocol.

One or more examples relate, generally, to systems, methods and devices for performing authenticated encryption that provides end-to-end data integrity, including the encryption and decryption processes.

In one or more examples, an error detecting code (EDC) is generated and inserted into a block of data utilized by an authenticated encryption algorithm to generate an authenticated encrypted block of data. In one or more examples, the EDC is inserted into a portion of a block of data where its presence will not affect the message structure of a message that comprises a portion of the block of data. For example, the presence of the EDC in a portion of a block of data that is encrypted by an authenticated encryption algorithm would affect a message structure, while a portion of a block of data that is strictly utilized for authentication, and more specifically, generating an authentication code, would not affect the contents of data stored in a payload of a packet simply by being present when the authentication code is generated.

A process for generating an authentication code is applied to the modified block of data that includes the EDC and cipher text. Notably, the generated authentication code is an authenticator for a message (i.e., for assuring data integrity of a message and message segments communicated via packetized data transmission), and also an authenticator for the encryption and decryption processes utilized to secure the messages (i.e., for assuring data integrity of message and message segments during the encryption process that transforms a plain text to a cipher text). The sender transmits the authentication codes together with the encrypted message segments.

At a receiver of the authenticated encrypted message (and more specifically, the encrypted message and authentication code), plain text data is recovered from the encrypted message at least partially responsive to applying a decryption process to the cipher text in the message. An EDC is generated utilizing the plain text data recovered from the cipher text. The EDC is inserted into a block of data utilized at the receiver to generate an authentication code (a transmitter authentication code). An authentication code received with the message (a receiver authentication code) and the second authentication are compared via an authentication process, and if the first and transmitter authentication codes are different based on the authentication process then the difference serves as an indication of the presence of an error in the message and erred data is detected. If the first and transmitter authentication codes are the same based on the authentication process, then the sameness serves an indication that the data is not erred.

Notably, a disclosed authentication code is an authenticator for a data path that begins with applying an encryption process to plain text data to produce a cipher text data, and ends with recovering plain text data from the cipher text data. Disclosed examples extend data integrity to include the encryption and decryption functions, which increases assurance that received messages correspond to the messages that a sender intended to be received.

Notably, disclosed authenticated encryption algorithms may be utilized for end-to-end data integrity, and error detection more generally, in cases where an authenticated encryption algorithm is utilized with a communication protocol that does not permit changes to a message structure or where changes to a message structure are undesirable.

FIG. 1 is a block diagram depicting a communication system 100, in accordance with one or more examples. In one or more examples, communication system 100 may be or include an interconnect, such as Peripheral Component Interconnect Express (PCIe), Compute Express Link (CXL), or variations thereon, without limitation, or utilize a layer 2.0 protocol such as Medium Access Control Security (MACsec), without limitation, that operates at a data link layer. Communication 110 between first party 102 (a transmission side of communication system 100) and second party 104 (a reception side of communication system 100) includes a block of data 106 that is authenticated and encrypted (i.e., an "authenticated encrypted block of data 106"). More specifically, block of data 106 is authenticated by authentication code 108 for authenticated encryption with EDC in accordance with one or more examples.

Figure 2:
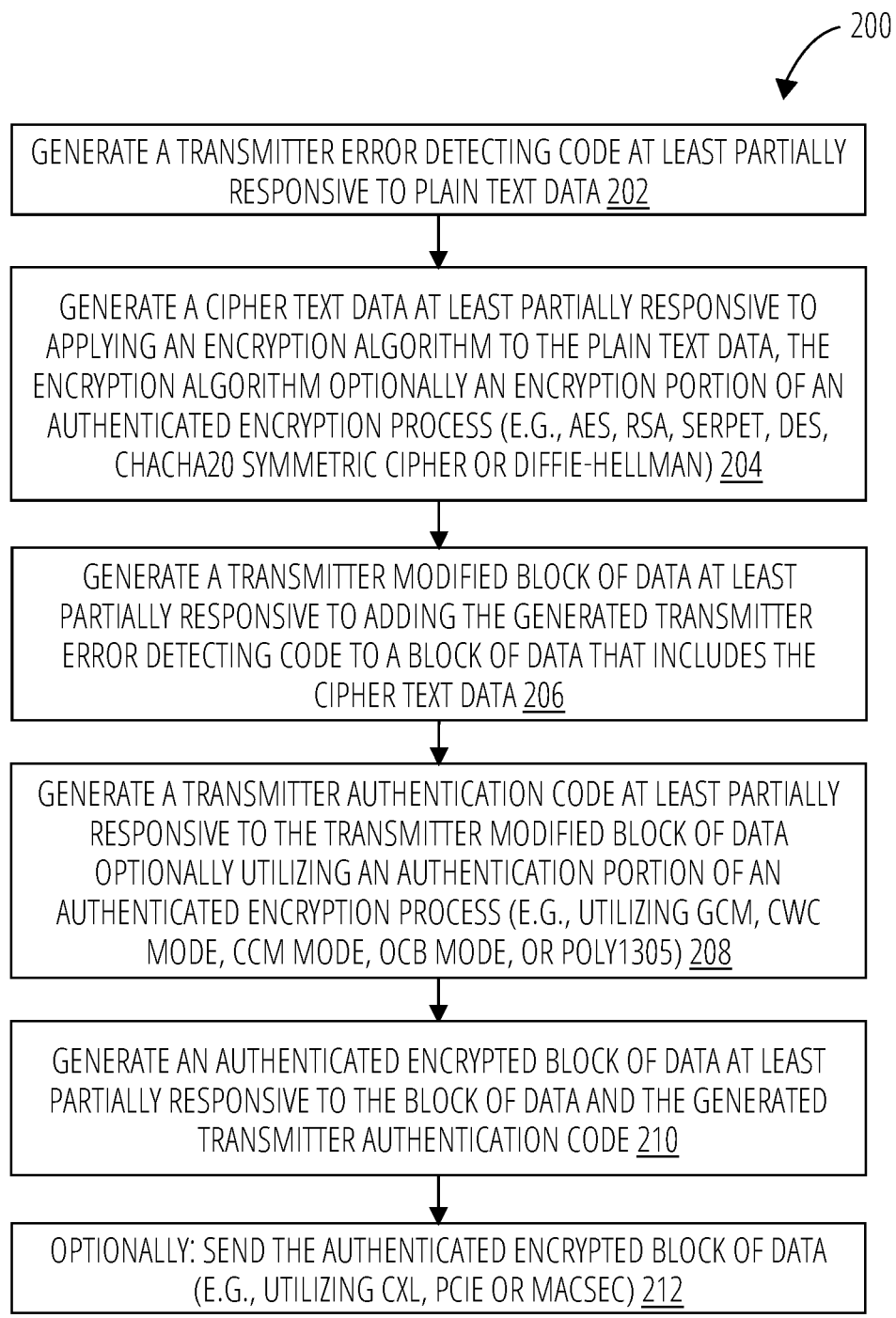
FIG. 2 is a functional flow block diagram depicting a process for a transmission side of a communication utilizing authenticated encryption with an error detecting code (EDC), in accordance with one or more examples.

FIG. 2 is a functional flow block diagram depicting process 200 for a transmission side of authenticated encryption with EDC, in accordance with one or more examples.

At operation 202, process 200 generates an error detecting code at least partially responsive to plain text data. In one or more examples, process 200 may derive the error detecting code from the plain text data by applying a cryptographic primitive to the plain text data, such as a cryptographic hashing function utilized to derive a Cyclic Redundancy Check (CRC), Checksum, or Hamming codes, without limitation.

At operation 204, process 200 generates a cipher text at least partially responsive to applying an encryption process to the plain text data. In one or more examples, the encryption process may be an encryption portion of an authenticated encryption process (e.g., AES, RSA, Serpent, Data Encryption Standard (DES), ChaCha20 symmetric cipher, or Diffie-Hellman, without limitation).

At operation 206, process 200 generates a modified block of data at least partially responsive to adding the generated EDC of operation 202 to a block of data that includes the cipher text data generated at operation 204. In one or more examples, any portion of the block of data may be chosen to insert the EDC that includes, or is allocated for, data that is used for authentication discussed herein (e.g., includes data that is utilized to generate the authentication code). In one or more examples, the chosen portion of the block of data may include data that is utilized for authentication but not encrypted, data that is encrypted and utilized for authentication, or both (e.g., the EDC is separated or multiple EDCs are generated, without limitation). In one or more examples, the EDC is not transmitted with an authenticated encrypted block of data, and is utilized only for authentication. In one or more examples, the EDC may be inserted at a portion of a block of data for associated data (e.g., "additional authenticated data" (AAD) in GCM, without limitation), cyphertext, or padding symbols, or appended or applied (e.g., used to apply encryption or transformation, without limitation) thereto, without limitation.

At operation 208, process 200 generates a receiver authentication code at least partially responsive to the modified block of data. In one or more examples, an authentication portion of an authenticated encryption process may be applied to the modified block of data that includes the EDC to generate the receiver authentication code. Non-limiting examples of authentication portion include GCM, CWC mode, CCM mode, OCB mode, or Poly1305. A primitive function may be utilized to generate the receiver authentication code such as $GHASH_H$, $GCTR_K$, and $MSB_t$ functions utilized in in AES-GCM.

At operation 210, process 200 generates an authenticated encrypted block of data at least partially responsive to the block of data and the generated receiver authentication code. In one or more examples, process 200 may associate the block of data and the generated receiver authentication code (e.g., by tagging the encrypted block of data with the authentication code, without limitation) to generate the authenticated encryption block of data.

At operation 212, process 200 optionally transmits the authenticated encrypted block of data generated at operation 210.

Figure 3:
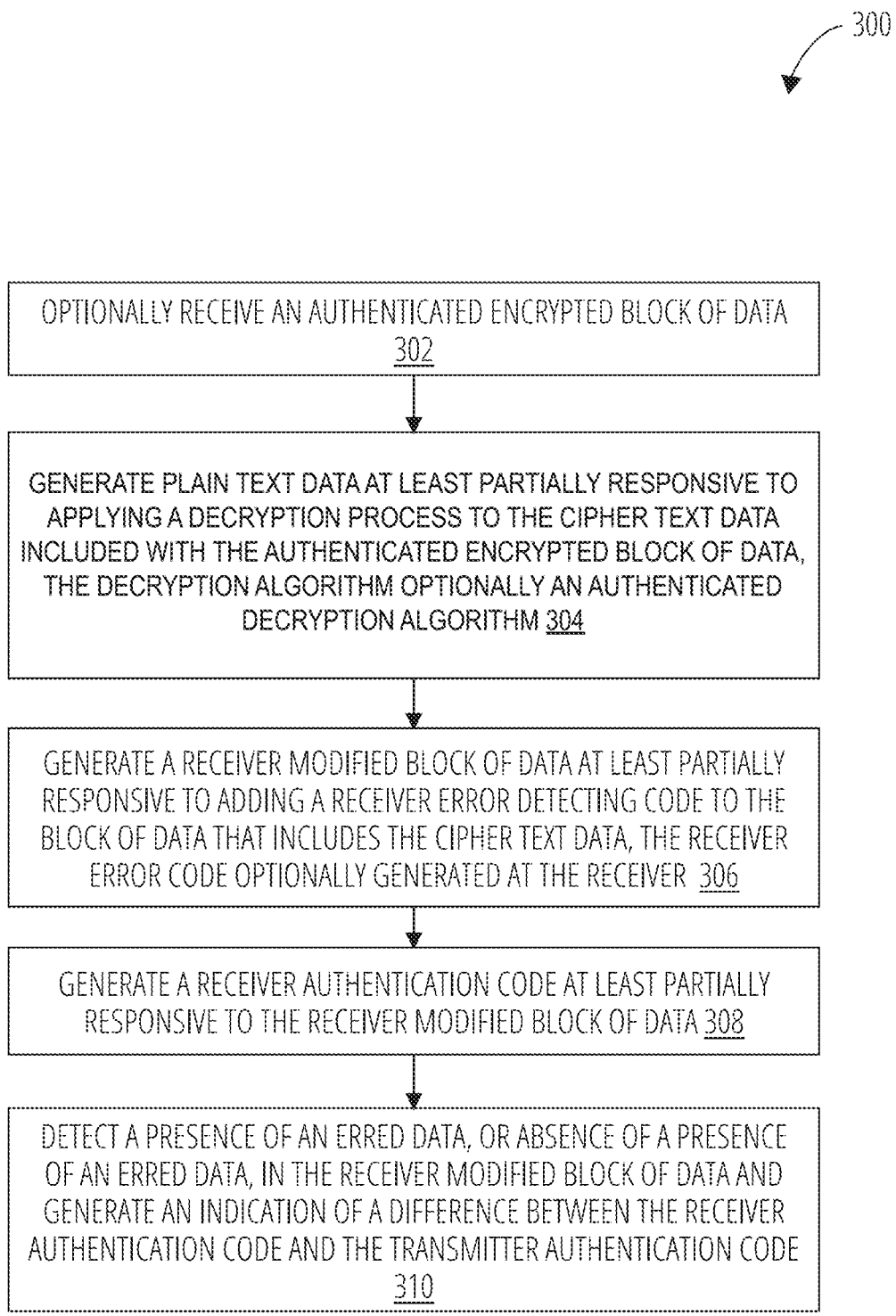
FIG. 3 is a flow diagram depicting a process for a reception side of a communication utilizing authenticated encryption with EDC, in accordance with one or more examples.

FIG. 3 is a flow diagram depicting a process 300 for a reception side of authenticated encryption with EDC, in accordance with one or more examples.

At operation 302, process 300 optionally receives an authenticated encrypted block of data. The authenticated encrypted block of data may be generated, for example, according to process 200.

At operation 304, process 300 generates plain text data at least partially responsive to applying a decryption process to a cipher text included with the authenticated encrypted block of data. In one or more examples, the decryption process may be a portion of an authenticated decryption process (e.g., decryption utilized in AES, RSA, Serpent, Data Encryption Standard (DES), ChaCha20 symmetric cipher, or Diffie-Hellman, without limitation).

At operation 306, process 300 generates a receiver modified block of data at least partially responsive to adding a receiver error detecting code to a receiver block of data. The receiver block of data may be, include or substantially correspond to an authenticated encrypted block of data.

In one or more examples, the receiver EDC is derived from the plain text data generated in operation 304. In one or more examples, a first portion of the receiver block of data includes data that is not encrypted (associated data), and a second portion of the data block includes data that is encrypted, namely, cipher text data. In one or more examples, the receiver EDC may be added to a portion of the receiver block of data that is the same as or complements the portion of the transmitter block of data where the transmitter EDC was inserted.

At operation 308, process 300 generates a receiver authentication code at least partially responsive to the modified block of data. In one or more examples, an authentication portion of an authenticated decryption process may be applied to the receiver modified block of data to generate the transmitter authentication code, as discussed above.

At operation 310, process 300 detects a presence of, or absence of, an erred data in the modified block of data at least partially responsive to an indication of a difference between a transmitter authentication code (received with the authenticated encrypted block of data at operation 302) and the receiver authentication code (generated at operation 308).

There is no limit on the number and reasons why an erred data may be detected. Non-limiting examples include: data was erred during transmission, data was erred during an encryption process, data was erred during a decryption process, data was intentionally manipulated, or a block of data being authenticated was not authenticated via a disclosed authenticated encryption algorithm that provides end-to-end data integrity.

Figure 4:
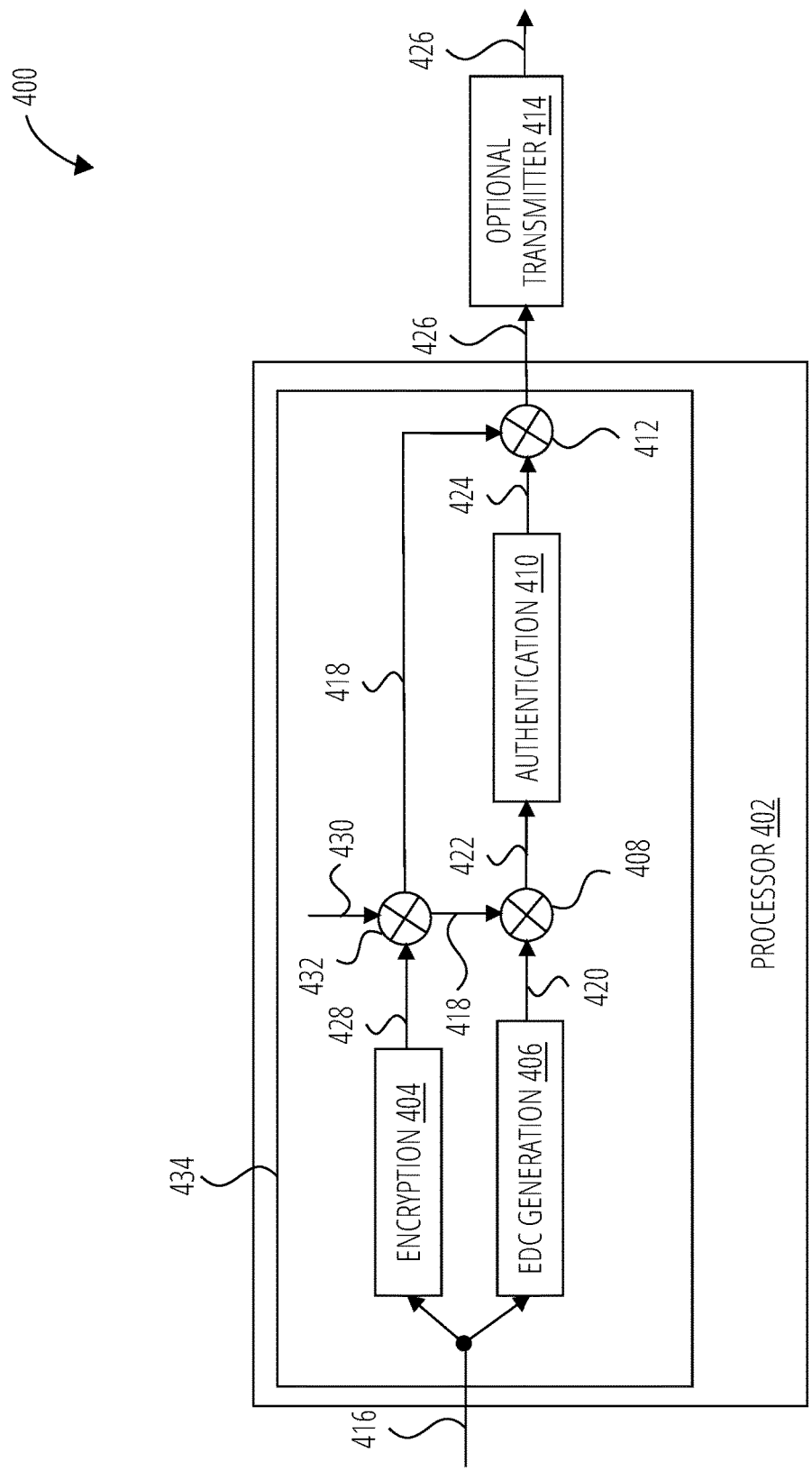
FIG. 4 is a functional flow block diagram depicting a functional flow of a transmission side of a communication system that utilizes authenticated encryption with EDC, in accordance with one or more examples.

FIG. 4 is a functional flow block diagram depicting a functional flow of a transmission side 400 of a communication system that utilizes authenticated encryption with EDC, in accordance with one or more examples. Transmission side 400 includes a processor 402 in communication with an optional transmitter 414 to transmit plain text data 416 as an authenticated encrypted data 426.

Processor 402 is configured, generally, to generate authenticated encrypted data 426 at least partially responsive to applying an authenticated encryption algorithm with EDC 434 (algorithm 434) to plain text data 416. FIG. 4 depicts various dependencies of functional blocks for performing algorithm 434 that is an authenticated encryption algorithm with EDC. Upon receiving plain text data 416, an encryption algorithm is applied to plain text data 416 at block 404 to generate cipher text data 428. Such an encryption algorithm may be, as a non-limiting example, an encryption portion of an authenticated encryption algorithm, as discussed herein. An EDC generation algorithm for deriving an error detecting code is applied to plain text data 416 at block 406 to generate transmitter EDC 420.

Cipher text data 428 is combined with transmitter associated data 430 at adder block 432 to generate transmitter block of data 418. Block of data 418 may include various strings that comprise cipher text data 428 and transmitter associated data 430, as well as others. In one or more examples, transmitter associated data 430 may be data that is used for authentication but not encrypted, nor, in one or more examples, transmitted, without limitation. Input data 430 may include network protocol data for specific communication protocol utilizing algorithm 434 to encrypt and authenticate communication, such as addresses, ports, sequence numbers, protocol and version numbers. Additionally or alternatively, transmitter associated data 430 may include a field that describes handling of plain text data 416.

Transmitter EDC 420 is combined with transmitter block of data 418 at adder block 408 to generate transmitter modified block of data 422. To combine transmitter EDC 420 and transmitter block of data 418 at adder block 408, transmitter EDC 420 may be inserted into any portion of transmitter block of data 418. FIG. 4 depicts two signal paths for transmitter block of data 418: a first signal path to adder block 408 where transmitter EDC 420 is combined with transmitter block of data 418 to generate transmitter modified block of data 422, and a second signal path to adder block 412 where it is combined with transmitter authentication code 424. The instance of transmitter block of data 418 that is conveyed to adder block 408 and to authentication block 410 as transmitter modified block of data 422 is ultimately transformed by the process of generating transmitter authentication code 424. The instance of transmitter block of data 418 that is conveyed to adder block 412 is not modified by transmitter EDC 420, nor transformed like the instance of transmitter block of data 418 input to adder block 408. So, while transmitter EDC 420 is utilized to generate transmitter modified block of data 422 and transmitter authentication code 424, it is not utilized by, nor included in, transmitter block of data 418, and transmitter block of data 418 may be transmitted without including transmitter EDC 420.

An authentication algorithm for deriving a code is applied to transmitter modified block of data 422 at block 410 to generate transmitter authentication code 424. Transmitter authentication code 424 is combined with transmitter block of data 418 at adder block 412 to generate authenticated encrypted data 426 (e.g., transmitter block of data 418 is tagged with transmitter EDC 420, without limitation). In one or more examples, an optional transmitter 414 may be provided for transmission of authenticated encrypted data 426.

Figure 5:
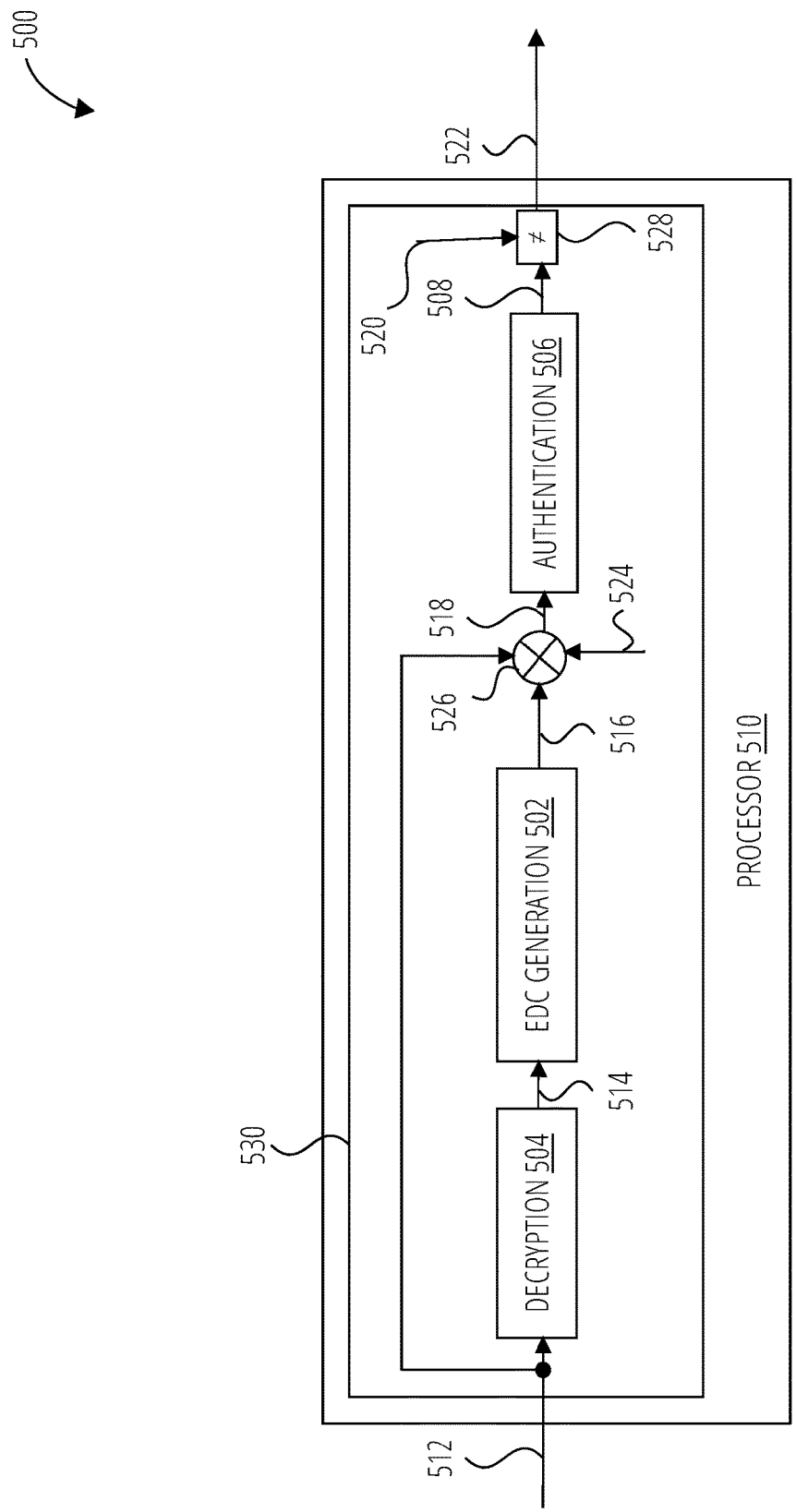
FIG. 5 is a functional flow block diagram depicting a functional flow of a reception side of a communication system that utilizes authenticated encryption with EDC, in accordance with one or more examples.

FIG. 5 is a functional flow block diagram depicting a functional flow of a reception side 500 of a communication system that utilizes an authenticated encryption with EDC, in accordance with one or more examples. Reception side 500 includes processor 512 to detect the presence, or absence, of erred data in received authenticated encrypted data 514.

Processor 512 is configured, generally, to generate an indication 524 of the presence, or absence, of erred data in authenticated encrypted data 514, at least partially responsive to applying an authenticated decryption algorithm with EDC 532 (algorithm 532) to the authenticated encrypted data 514.

Plain text data 516 is generated by applying a decryption algorithm to cipher text data of authenticated encrypted data 514 at decryption block 504. An algorithm for deriving an EDC is applied to plain text data 516 at block 502 to generate EDC 518. EDC 518, authenticated encrypted data 514, and receiver associated data 526 (which may have the same or different content than transmitter associated data 430) are combined at block 528 to generate receiver modified block of data 520. An authentication algorithm for deriving a code is applied to receiver modified block of data 520 at block 506 to generate receiver authentication code 510.

Receiver authentication code 510 is compared to transmitter authentication code 522 of authenticated encrypted data 514 and an indication 524 of a result generated at block 530. The comparison may be performed, as a non-limiting example, according to an authentication process. Detector 508 utilizes an output or outcome of the authentication process indicated by indication 524 to detect a presence, or absence, of erred data in an authenticated encrypted data 514.

Figure 6:
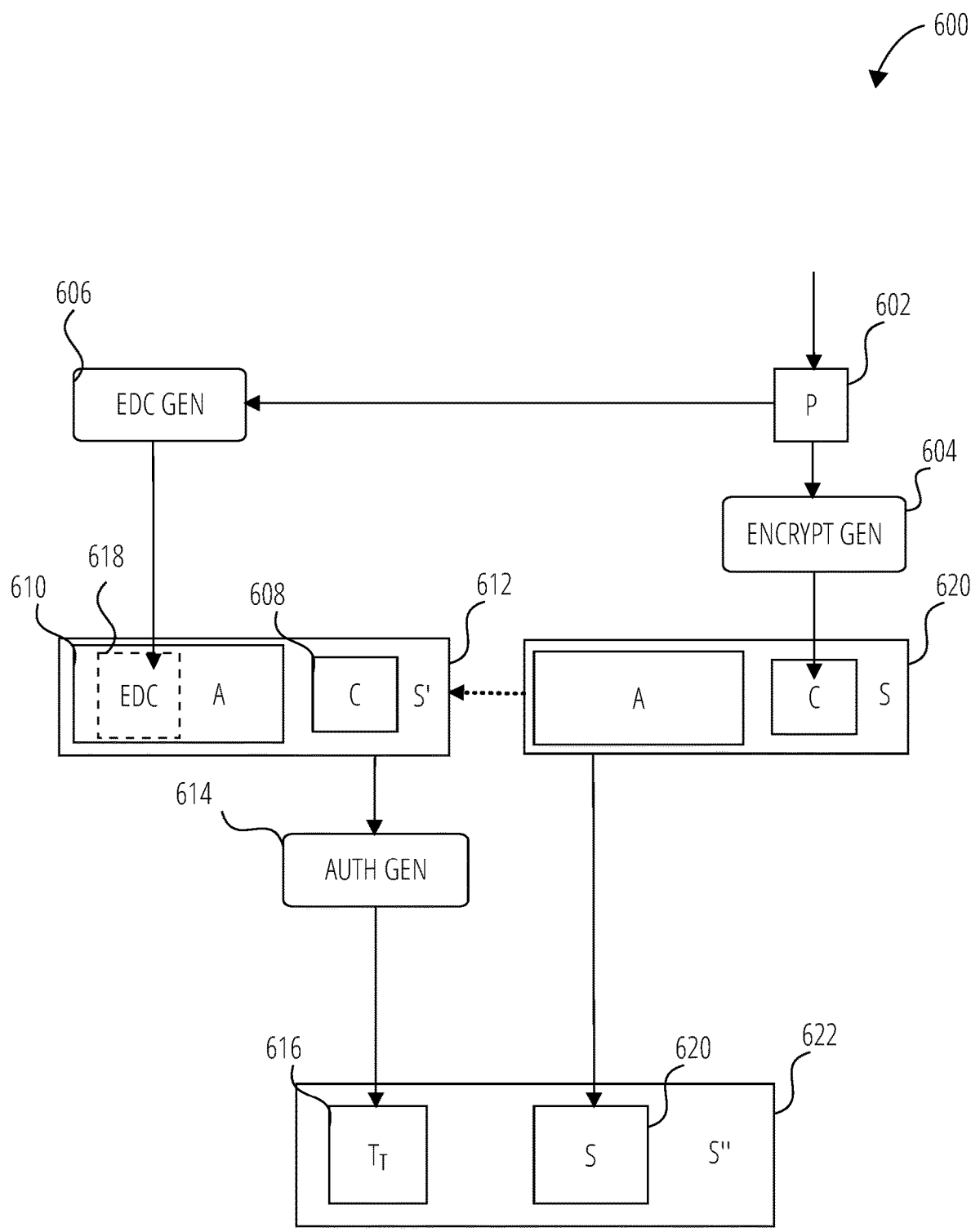
FIG. 6 is a functional block diagram depicting a data transformation by an algorithm for authenticated encryption with EDC, in accordance with one or more examples.

FIG. 6 is a functional block diagram depicting a data transformation by an algorithm 600 for authenticated encryption with EDC, in accordance with one or more examples. The flow of algorithm 600 depicted by FIG. 6 generally complements the flow of algorithm 434 depicted by FIG. 4.

In the specific non-limiting example depicted by FIG. 6, algorithm 600 begins with receipt of plain text data P (data block 602), similar to receipt of plain text data 416 of FIG. 4.

A derivation function EDC Gen (functional block 606) takes the plain text data P as an input and generates an EDC data EDC (data block 618). A cipher text data C (data block 608) is generated by an encryption function Encrypt Gen (functional block 604) that takes the plain text data P as an input.

A modified block of data S' (block 612) includes the cipher text data C, an associated data A (data block 610), and the EDC data EDC (here, inserted with the associated data A). The prime label of modified block of data S' is used herein to indicate a modified block of data S' that is generated by adding the EDC data FDC to a block of data S (block of data 620).

An authentication code $T_T$ (data block 616) is generated by a derivation function Auth Gen (functional block 614) that takes modified block of data S' as an input. Block of data S and authentication code $T_T$ are combined at block 622 to generate authenticated encrypted block of data S".

Figure 7:
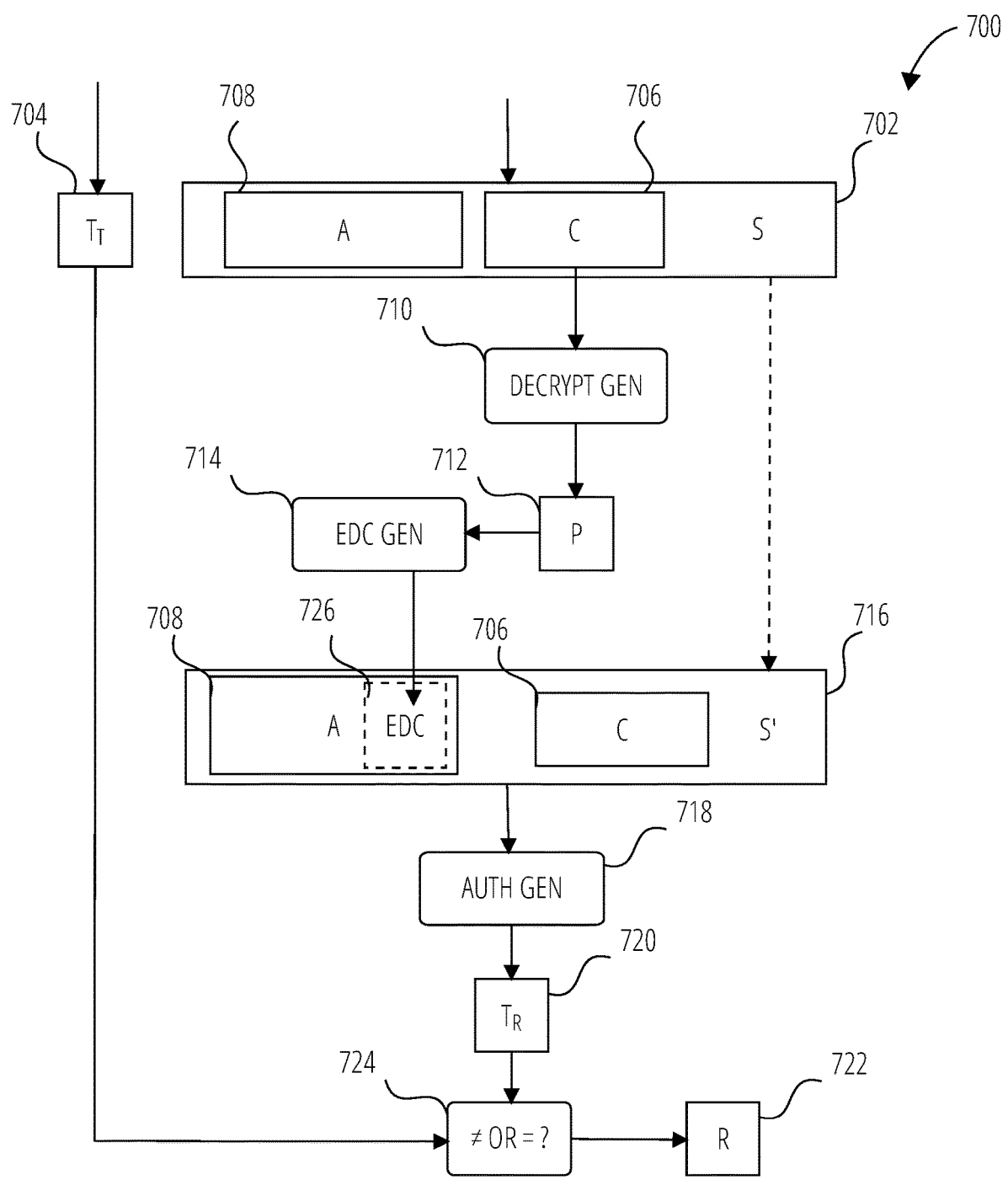
FIG. 7 is a functional block diagram depicting a data transformation by an algorithm for authenticated encryption with EDC, in accordance with one or more examples.

FIG. 7 is a functional block diagram depicting a data transformation by an algorithm 700 for authenticated encryption with EDC, in accordance with one or more examples. The flow of algorithm 700 depicted by FIG. 7 generally complements the flow of algorithm 532 depicted by FIG. 5.

In the specific non-limiting example depicted by FIG. 7, algorithm 700 begins with obtaining a block of data S (data block 702) and a transmitter authentication code $T_T$. The block of data S may be, or be obtained from an authenticated encrypted data, such as authenticated encrypted data 426 of FIG. 4, authenticated encrypted data 514 of FIG. 5, or an authenticated encrypted data S" of FIG. 6. Block of data S includes cipher text data C (data block 706) and associated data A (data block 708).

A plain text data P (data block 712) is generated by a decryption function Decrypt Gen (functional block 710) that takes cipher text data C as an input. A transmitter EDC data EDC (data block 726) is generated by a derivation function FDC Gen (functional block 714) that takes the generated plain text data P as an input.

A modified block of data S' (data block 716) is generated by inserting the transmitter EDC data EDC into the block of data S that includes the cipher text data C and the associated data A. Transmitter EDC data EDC is inserted at block of data S (here, a portion of block of data S that includes associated data A, but any portion(s) of block of data S or appended or applied (e.g., used to apply encryption or transformation, without limitation) thereto, is contemplated) to generate the modified block of data S'.

An authentication code T (data block 720) is generated by a derivation function Auth Gen (functional block 718) that takes modified block of data S' as an input. Authentication code $T_R$ is compared (functional block 724) to authentication code $T_T$ (data block 704) obtained together with block of data S. The result R (block 722) of the comparison is an indication of the presence, or absence, of erred data at block of data S.

Figure 8:
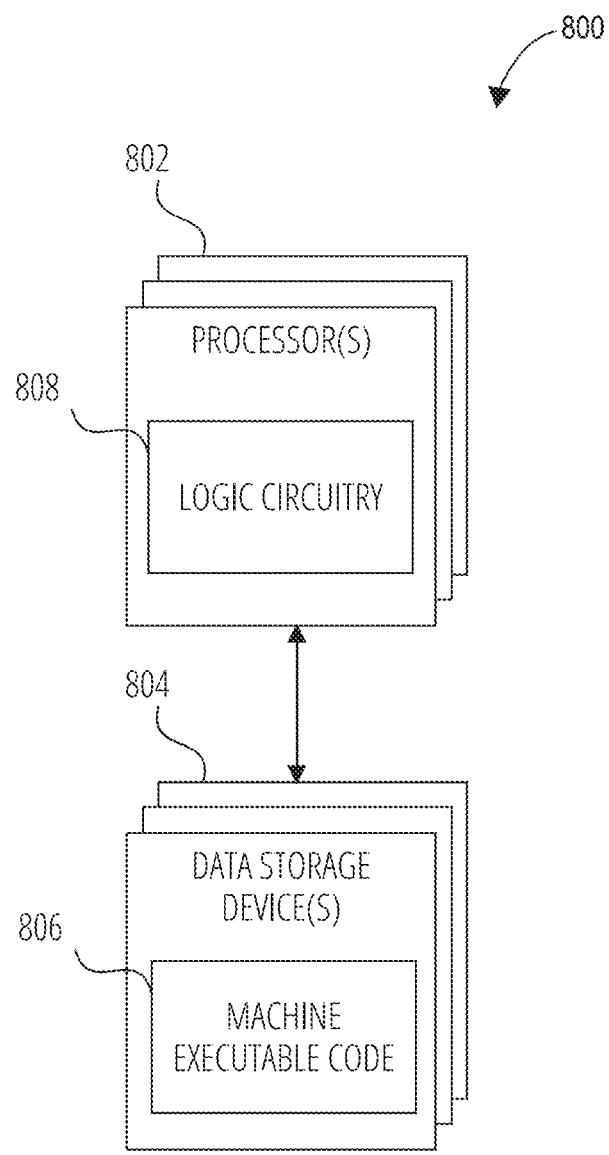
FIG. 8 is a circuitry that may be used to implement various functions, operations, acts, processes, or methods in accordance with one or more examples.

It will be appreciated by those of ordinary skill in the art that functional elements of examples disclosed herein (e.g., functions, operations, acts, processes, or methods, without limitation) may be implemented in any suitable hardware, software, firmware, or combinations thereof. FIG. 8 illustrates non-limiting examples of implementations of functional elements disclosed herein. In various examples, some or all portions of the functional elements disclosed herein may be performed by hardware specially configured for carrying out the functional elements.

FIG. 8 is a block diagram of circuitry 800 that, in various examples, may be used to implement various functions, operations, acts, processes, or methods disclosed herein. The circuitry 800 includes one or more processors 802 (sometimes referred to herein as "processors 802") operably coupled to one or more data storage devices (sometimes referred to herein as "storage 804"). The storage 804 includes machine executable code 806 stored thereon and the processors 802 include logic circuitry 808. The machine executable code 806 includes information describing functional elements that may be implemented by (e.g., performed by) the logic circuitry 808. The logic circuitry 808 is adapted to implement (e.g., perform) the functional elements described by the machine executable code 806. The circuitry 800, when executing the functional elements described by the machine executable code 806, should be considered as special purpose hardware configured for carrying out functional elements disclosed herein. In various examples, the processors 802 may be configured to perform the functional elements described by the machine executable code 806 sequentially, concurrently (e.g., on one or more different hardware platforms), or in one or more parallel process streams.

When implemented by logic circuitry 808 of the processors 802, the machine executable code 806 is configured to adapt the processors 802 to perform operations of examples disclosed herein. For example, the machine executable code 806 may be configured to adapt the processors 802 to perform at least a portion or a totality of the features and functions discussed with reference to communication system 100, transmission side 400, and reception side 500.

As a specific, non-limiting example, the machine executable code 806 may be configured to adapt the processors 802 to perform at least a portion of the EDC generation and authenticated encryption utilizing EDC discussed herein, including, for example, process 200 of FIG. 2, process 300 of FIG. 3, algorithm 600, and algorithm 700.

The processors 802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 806 (e.g., software code, firmware code, hardware descriptions) related to examples of the present disclosure. It is noted that a general-purpose processor (may also be referred to herein as a host processor or simply a host) may be a microprocessor, but in the alternative, the processors 802 may include any conventional processor, controller, microcontroller, or state machine. The processors 802 may also be implemented as a combination of computing devices, such as a combination of a DSP and a microprocessor, a plurality of microprocessors, one or more microprocessors in conjunction with a DSP core, or any other such configuration.

In various examples, the storage 804 includes volatile data storage (e.g., random-access memory (RAM)), non-volatile data storage (e.g., Flash memory, a hard disc drive, a solid state drive, erasable programmable read-only memory (EPROM), without limitation). In various examples, the processors 802 and the storage 804 may be implemented into a single device (e.g., a semiconductor device product, a system on chip (SoC), without limitation). In various examples, the processors 802 and the storage 804 may be implemented into separate devices.

In various examples, the machine executable code 806 may include computer-readable instructions (e.g., software code, firmware code). By way of non-limiting example, the computer-readable instructions may be stored by the storage 804, accessed directly by the processors 802, and executed by the processors 802 using at least the logic circuitry 808. Also by way of non-limiting example, the computer-readable instructions may be stored on the storage 804, transferred to a memory device (not shown) for execution, and executed by the processors 802 using at least the logic circuitry 808. Accordingly, in various examples, the logic circuitry 808 includes electrically configurable logic circuitry 808.

In various examples, the machine executable code 806 may describe hardware (e.g., circuitry) to be implemented in the logic circuitry 808 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG®, SYSTEMVERILOG™ or very large scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in various examples, the machine executable code 806 may include an HDL, an RTL, a GL description, a mask level description, other hardware description, or any combination thereof.

In examples where the machine executable code 806 includes a hardware description (at any level of abstraction), a system (not shown, but including the storage 804) may be configured to implement the hardware description described by the machine executable code 806. By way of non-limiting example, the processors 802 may include a programmable logic device (e.g., an FPGA or a PLC) and the logic circuitry 808 may be electrically controlled to implement circuitry corresponding to the hardware description into the logic circuitry 808. Also by way of non-limiting example, the logic circuitry 808 may include hard-wired logic manufactured by a manufacturing system (not shown, but including the storage 804) according to the hardware description of the machine executable code 806. Such manufacturing of hard-wired logic may also be characterized herein as permanently configuring logic circuitry of a processor.

Regardless of whether the machine executable code 806 includes computer-readable instructions or a hardware description, the logic circuitry 808 is adapted to perform the functional elements described by the machine executable code 806 when implementing the functional elements of the machine executable code 806. It is noted that although a hardware description may not directly describe functional elements, a hardware description indirectly describes functional elements that the hardware elements described by the hardware description are capable of performing.

A person having ordinary skill in the art will appreciate that disclosed examples may be applied to increase authentication and/or data integrity in many contexts not just the specific examples discussed herein. As a non-limiting example, it may be used in memory encryption application where a data-at-rest in a memory is encrypted utilizing a block cipher such as Xor-encrypt-xor (AES-XEX) or XEX based tweaked-codebook mode with cyphertext sealing (AES-XTS), and the data-at-rest is authenticated using a Secure Hash Algorithm such as SHA3-KMAC-256 or another SHA. Such authentication may be enhanced with the EDC such that a MAC generated from a SHA engine is generated from an EDC enhanced input data block. As a non-limiting example, such an enhancement may be applied to authenticated encryption of data-at-rest at a DRAM attached to a Host CPU and Dynamic Random Access Memory (DRAM) attached via CXL interfaces.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means some or a totality. As used herein, the term "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: An apparatus, comprising: a processor configured to: generate a receiver modified block of data at least partially responsive to adding an error detecting code to a block of data; generate a receiver authentication code at least partially responsive to the receiver modified block of data; and generate an indication of a difference between the receiver authentication code and a transmitter authentication code.

Example 2: The apparatus according to Example 1, wherein the processor is configured to: generate a plain text data at least partially responsive to applying a decryption portion of an authenticated decryption algorithm to a cipher text data included with an authenticated encrypted block of data; and generate the error detecting code at least partially responsive to the plain text data.

Example 3: The apparatus according to any of Examples 1 and 2, wherein the processor is configured to perform an algorithm for generating the error detecting code from the plain text data.

Example 4: The apparatus according to any of Examples 1 through 3, wherein the authenticated decryption algorithm is AES-GCM.

Example 5: The apparatus according to any of Examples 1 through 4, wherein the processor is provided at a communication system.

Example 6: The apparatus according to any of Examples 1 through 5, wherein the communication system is for a Compute Express Link (CXL) interconnect.

Example 7: The apparatus according to any of Examples 1 through 6, wherein the communication system is for a Peripheral Component Interconnect Express (PCIe) interconnect.

Example 8: The apparatus according to any of Examples 1 through 7, wherein the adding the error detecting code to the block of data comprises adding the error detecting code to a portion of the block of data for additional authenticated data.

Example 9: An apparatus, comprising: a processor, the processor configured to: generate an error detecting code at least partially responsive to a plain text data; generate a cipher text data at least partially responsive to applying an encryption algorithm to the plain text data; generate a transmitter modified block of data at least partially responsive to adding the error detecting code to a block of data that includes the cipher text data; and generate an authentication code at least partially responsive to the transmitter modified block of data; generate an authenticated encrypted block of data at least partially responsive to the authentication code; and a transmitter, the transmitter configured to transmit an authenticated encrypted block of data.

Example 10: The apparatus according to Example 9, wherein the processor is configured to perform a derivation function generate the error detecting code from the plain text data.

Example 11: The apparatus according to any of Examples 9 and 10, wherein the process is configured to generate an authenticated encrypted block of data at least partially responsive to the block of data and the authentication code.

Example 12: The apparatus according to any of Examples 9 through 11, wherein the transmitted block of data includes the cipher text data.

Example 13: The apparatus according to any of Examples 9 through 12, wherein the transmitted block of data does not include the error detecting code that was added to the block of data to generate the transmitter modified block of data.

Example 14: The apparatus according to any of Examples 9 through 13, wherein the authenticated encryption algorithm is AES-GCM.

Example 15: The apparatus according to any of Examples 9 through 14, wherein the processor is provided at a communication system.

Example 16: The apparatus according to any of Examples 9 through 15, wherein the communication system is for a Compute Express Link (CXL) interconnect.

Example 17: The apparatus according to any of Examples 9 through 16, wherein the communication system is for a Peripheral Component Interconnect Express (PCIe) interconnect.

Example 18: A method, comprising: generating a receiver modified block of data at least partially responsive to adding a receiver error detecting code to a block of data; and generating a receiver authentication code at least partially responsive to the receiver modified block of data; and detecting a presence or absence of an erred data in the block of data at least partially responsive a difference between the receiver authentication code and a transmitter authentication code.

Example 19: The method according to Example 18, comprising: generating a plain text data at least partially responsive to applying a decryption portion of an authenticated decryption algorithm to a cipher text data included with an authenticated encrypted block of data; and generating the receiver error detecting code at least partially responsive to the plain text data.

Example 20: The method according to any of Examples 18 and 19, wherein the authenticated decryption algorithm is AES-GCM.

Example 21: The method according to any of Examples 18 through 20, comprising: generating the receiver error detecting code by applying a derivation function to the plain text data.

Example 22: The method according to any of Examples 18 through 21, comprising receiving an authenticated encrypted block of data at a communication system.

Example 23: The method according to any of Examples 18 through 22, wherein the communication system is for a Compute Express Link (CXL) interconnect.

Example 24: The method according to any of Examples 18 through 23, wherein the communication system is for a Peripheral Component Interconnect Express (PCIe) interconnect.

Example 25: The method according to any of Examples 18 through 24, wherein the adding the receiver error detecting code to the block of data comprises adding the receiver error detecting code to a portion of the block of data for associated data.

Example 26: A method, comprising: generating an transmitter error detecting code at least partially responsive to a plain text data; generating a cipher text data at least partially responsive to applying an encryption algorithm to the plain text data; generating a transmitter modified block of data at least partially responsive to adding an error detecting code to a block of data that includes the cipher text data; generating a transmitter authentication code at least partially responsive to the transmitter modified block of data; generating an authenticated encrypted block of data at least partially responsive to the transmitter authentication code and the block of data; and transmitting the authenticated encrypted block of data.

Example 27: The method according to Example 26, comprising performing a derivation function to generate the transmitter error detecting code from the plain text data.

Example 28: The method according to any of Examples 26 and 27, comprising generating an authenticated encrypted block of data at least partially responsive to the block of data and the transmitter authentication code.

Example 29: The method according to any of Examples 26 through 28, wherein the block of data of the authenticated encrypted block of data does not include the error detecting code that was added to the block of data to generate the transmitter modified block of data.

Example 30: The method according to any of Examples 26 through 29, wherein the authenticated encryption algorithm is AES-GCM.

Example 31: The method according to any of Examples 26 through 30, comprising transmitting the authenticated encrypted block of data at a communication system.

Example 32: The method according to any of Examples 26 through 31, wherein the communication system is for a Compute Express Link (CXL) interconnect.

Example 33: The method according to any of Examples 26 through 32, wherein the communication system is for a Peripheral Component Interconnect Express (PCIe) interconnect.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
   a processor configured to:
   generate a receiver modified block of data at least partially responsive to adding an error detecting code to a block of data, the receiver modified block of data including the error detecting code;
   generate a receiver authentication code at least partially responsive to the receiver modified block of data; and
   generate an indication of a difference between the receiver authentication code and a transmitter authentication code.

2. The apparatus of claim 1, wherein the processor is configured to:
   generate a plain text data at least partially responsive to applying a decryption portion of an authenticated decryption algorithm to a cipher text data included with an authenticated encrypted block of data; and
   generate the error detecting code at least partially responsive to the plain text data.

3. The apparatus of claim 2, wherein the processor is configured to perform an algorithm for generating the error detecting code from the plain text data.

4. The apparatus of claim 2, wherein the authenticated decryption algorithm is AES-GCM.

5. The apparatus of claim 1, wherein the processor is provided at a communication system.

6. The apparatus of claim 5, wherein the communication system is for a Compute Express Link (CXL) interconnect.

7. The apparatus of claim 5, wherein the communication system is for a Peripheral Component Interconnect Express (PCIe) interconnect.

8. The apparatus of claim 1, wherein the adding the error detecting code to the block of data comprises adding the error detecting code to a portion of the block of data for additional authenticated data.

9. A method, comprising:
   generating a receiver modified block of data at least partially responsive to adding a receiver error detecting code to a block of data, the receiver modified block of data including the receiver error detecting code;

generating a receiver authentication code at least partially responsive to the receiver modified block of data; and detecting a presence or absence of an erred data in the block of data at least partially responsive a difference between the receiver authentication code and a transmitter authentication code.

10. The method of claim 9, comprising:

generating a plain text data at least partially responsive to applying a decryption portion of an authenticated decryption algorithm to a cipher text data included with an authenticated encrypted block of data; and generating the receiver error detecting code at least partially responsive to the plain text data.

11. The method of claim 10, wherein the authenticated decryption algorithm is AES-GCM.

12. The method of claim 9, comprising: generating the receiver error detecting code by applying a derivation function to a plain text data.

13. The method of claim 9, comprising receiving an authenticated encrypted block of data at a communication system.

14. The method of claim 13, wherein the communication system is for a Compute Express Link (CXL) interconnect.

15. The method of claim 13, wherein the communication system is for a Peripheral Component Interconnect Express (PCIe) interconnect.

16. The method of claim 9, wherein the adding the receiver error detecting code to the block of data comprises adding the receiver error detecting code to a portion of the block of data for associated data.

* * * * *

UNITED STATES PATENT AND TRADEMARK OFFICE
CERTIFICATE OF CORRECTION

| | | Page 1 of 1 |
|---|---|---|
| PATENT NO. | : 12,267,409 B2 | |
| APPLICATION NO. | : 17/304011 | |
| DATED | : April 1, 2025 | |
| INVENTOR(S) | : David Joseph Clinton and Patrick Bailey | |

It is certified that error appears in the above-identified patent and that said Letters Patent is hereby corrected as shown below:

In the Specification

| Column 9, | Line 59, | change "EDC data FDC to a" to --EDC data EDC to a-- |
| Column 10, | Lines 18-19, | change "function FDC Gen" to --function EDC Gen-- |
| Column 10, | Line 21, | change "data S′(data block" to --data S′ (data block-- |
| Column 10, | Line 30, | change "code T (data" to --code $T_R$ (data-- |

Signed and Sealed this
Fifteenth Day of July, 2025

Coke Morgan Stewart
*Acting Director of the United States Patent and Trademark Office*